United States Patent
Kim et al.

(10) Patent No.: US 9,037,906 B2
(45) Date of Patent: May 19, 2015

(54) MOBILE TERMINAL AND CONTROLLING METHOD THEREOF

(71) Applicant: LG ELECTRONICS INC., Seoul (KR)

(72) Inventors: Taeyong Kim, Seoul (KR); Chanwoo Lee, Seoul (KR); Jungbin Lee, Seoul (KR); Soojin Kim, Seoul (KR); Jaecheol Kwak, Seoul (KR); Gahee Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 13/737,680

(22) Filed: Jan. 9, 2013

(65) Prior Publication Data

US 2013/0191686 A1    Jul. 25, 2013

(30) Foreign Application Priority Data

Jan. 9, 2012  (KR) .................. 10-2012-0002377

(51) Int. Cl.
*G06F 11/14* (2006.01)

(52) U.S. Cl.
CPC ........ *G06F 11/1458* (2013.01); *G06F 11/1448* (2013.01); *G06F 11/1464* (2013.01); *G06F 11/1469* (2013.01)

(58) Field of Classification Search
CPC ............ G06F 11/0742; G06F 11/1402; G06F 11/1412; G06F 11/1415; G06F 11/1446; G06F 11/1458; G06F 11/1464; G06F 11/1469
USPC ...................................................... 714/2, 15
See application file for complete search history.

(56) References Cited

U.S. PATENT DOCUMENTS

| | | | |
|---|---|---|---|
| 7,334,157 B1 * | 2/2008 | Graf et al. ........................ 714/13 |
| 7,356,679 B1 * | 4/2008 | Le et al. ............................ 713/1 |
| 7,489,782 B1 * | 2/2009 | DeVos ........................... 380/278 |
| 7,769,990 B1 * | 8/2010 | Okcu et al. ........................ 713/1 |
| 7,805,631 B2 * | 9/2010 | Fries ............................ 714/6.12 |
| 7,886,185 B1 * | 2/2011 | Okcu et al. ..................... 719/328 |
| 7,937,609 B2 * | 5/2011 | Braeker et al. .................... 714/2 |
| 7,996,708 B1 * | 8/2011 | Mohl ................................ 714/3 |
| 8,095,858 B2 * | 1/2012 | Peters .......................... 714/798 |
| 8,132,186 B1 * | 3/2012 | Okcu et al. ..................... 719/321 |
| 8,645,748 B1 * | 2/2014 | Chepel et al. ................ 714/6.12 |
| 8,751,457 B2 * | 6/2014 | Grigg et al. ................... 707/667 |
| 2005/0102329 A1 * | 5/2005 | Jiang et al. .................... 707/204 |
| 2005/0125460 A1 | 6/2005 | Yu et al. |
| 2007/0168721 A1 * | 7/2007 | Luiro et al. ..................... 714/15 |

(Continued)

OTHER PUBLICATIONS

European Patent Office Application Serial No. 12199112.9, Search Report dated Nov. 3, 2014, 12 pages.

*Primary Examiner* — Marc Duncan
(74) *Attorney, Agent, or Firm* — Lee, Hong, Degerman, Kang & Waimey

(57) ABSTRACT

A mobile terminal and controlling method thereof are disclosed, by which restoration and backup operations are performed for the mobile terminal. The present invention includes backing up data for at least one application included in a backup target terminal and restoring the data for the at least one application in a restoration target terminal, the restoring including the performing a basic restoration operation on the data related to the at least one application, determining whether a previously provided restoration error occurs in a data restoring process for a specific application among the at least one or more applications, and performing a restoration operation corresponding to the restoration error in accordance with a result of the determining.

12 Claims, 12 Drawing Sheets

(56) References Cited

U.S. PATENT DOCUMENTS

| | | |
|---|---|---|
| 2008/0114855 A1 | 5/2008 | Welingkar et al. |
| 2008/0201607 A1* | 8/2008 | Braeker et al. ............. 714/15 |
| 2009/0249119 A1* | 10/2009 | Sethumadhavan et al. ..... 714/15 |
| 2010/0115334 A1* | 5/2010 | Malleck et al. ............. 714/15 |
| 2011/0016089 A1* | 1/2011 | Freedman et al. ............ 707/640 |
| 2012/0129503 A1* | 5/2012 | Lindeman et al. ......... 455/414.1 |
| 2013/0061089 A1* | 3/2013 | Valiyaparambil et al. ...... 714/15 |
| 2013/0173556 A1* | 7/2013 | Grigg et al. ................. 707/667 |

\* cited by examiner

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2012-0002377, filed on Jan. 9, 2012, the contents of which are hereby incorporated by reference herein in their entirety.

FIELD

The present disclosure relates to a mobile terminal, and more particularly, to a mobile terminal and controlling method thereof. Although the invention disclosed and exemplified herein is suitable for a wide scope of applications, it is particularly suitable for performing restoration and backup operations for the mobile terminal.

DISCUSSION OF THE RELATED ART

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

Moreover, with the recent advent of a smart phone, a program or application for a function desired by a user can be individually added. In the past, a program installed by a terminal manufacturer was just usable. Yet, such a current terminal as a smart phone enables a user to search for a desired application and to install the found application on the terminal of the user. Hence, various users are able to implement terminal environments differing from each other in user's terminals, respectively.

SUMMARY

The present disclosure relates to a method of performing complete backup and restoration operations via an access authority for accessing application data to back up and restore in a mobile terminal having an open operating system.

The present disclosure further relates to a method of providing a user-desired optimal backup and restoration environment to prepare for various restoration problems that may occur in a backup and restoration process.

Features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A mobile terminal, which is operated by an open operating system, according to one example embodiment of the present invention may include a controller configured to perform a backup operation and a restoration operation on the mobile terminal, the controller including an application module configured to activate a backup restoration application and at least one or more applications and a Linux kernel module configured to manage a basic hardware function of the mobile terminal, the Linux kernel module comprising a backup restoration service unit having an access authority for accessing a file system of each of the at least one or more applications, wherein the backup restoration application accesses the file system of each of the at least one or more applications and then performs the backup and restoration operations on data of each of the at least one or more applications.

Preferably, the open operating system may include an Android™ operating system (OS).

Preferably, the backup restoration service unit may be created based on an init.rc file for creating the backup restoration service unit in an init process of the mobile terminal.

More preferably, a channel socket may be created based on the init.rc file and the backup restoration application and the backup restoration service unit may be connected with each other via the created channel socket.

Preferably, the backup restoration application may back up and restore the at least one application and a detailed application information related to the at least one application.

Preferably, an access to the file system for a specific application among the at least one or more applications may be granted to each of the specific application and the backup restoration service unit only.

Preferably, the mobile terminal may further include a memory configured to store data backed up by the backup restoration application.

Preferably, the mobile terminal may further include a wireless communication unit configured to transmit the data backed up by the backup restoration application to an external storage server.

Preferably, the mobile terminal may further include a display unit configured to display an indicator window indicating a progress level for a backup restoration operation of the backup restoration application.

In another example embodiment of the present invention, in performing a backup operation and a restoration operation on a mobile terminal operated by an open operating system, a method of controlling the mobile terminal according to another example embodiment of the present invention may include creating a backup restoration service, which has an access authority for accessing a file system of each of at least one or more applications included in the mobile terminal, via an init process of the mobile terminal, establishing a channel between the created backup restoration service and a backup restoration application, and performing a backup operation and a restoration operation on each of the at least one or more applications by the backup restoration application, wherein the backup restoration application accesses the file system of each of the at least one or more applications via the backup restoration service and then performs the backup and restoration operations on data of each of the at least one or more applications.

Preferably, the open operating system may include an Android™ operating system (OS).

Preferably, the backup restoration service may be created based on an init.rc file for creating the backup restoration service in the init process.

More preferably, a channel socket may be created based on the init.rc file and the backup restoration application and the backup restoration service may be connected with each other via the created channel socket.

Preferably, the backup restoration application may back up and restore the at least one application and a detailed application information related to the at least one application.

Preferably, an access to the file system for a specific application among the at least one or more applications may be granted to each of the specific application and the backup restoration service unit only.

In another example embodiment of the present invention, a method of controlling a mobile terminal according to another embodiment of the present invention may include backing up data for at least one application included in a backup target terminal and restoring the data for the at least one application in a restoration target terminal, the restoring including the performing a basic restoration operation on the data related to the at least one application, determining whether a previously provided restoration error occurs in a data restoring process for a specific application among the at least one or more applications, and performing a restoration operation corresponding to the restoration error in accordance with a result of the determining.

Preferably, the method may further include displaying an indicator window configured to indicate a process for performing the restoration operation related to the at least one application.

Preferably, during the determining, a case that the specific application installed on the backup target terminal does not exist in the restoration target terminal may be determined as the previously provided restoration error. And, when performing the restoration operation, if the previously provided restoration error is determined, the specific application may be installed on the restoration target terminal and detailed application information related to the specific application may be then restored at a timing point of completing the installation.

More preferably, the specific application may be installed on the restoration target terminal by accessing an external server configured to store backup data for the at least one application.

Preferably, during the determining, a case that a version of the specific application previously installed on the restoration target terminal before the restoration is more recent than that of the specific application installed on the backup target terminal may be determined as the previously provided restoration error. And, in performing the restoration operation, when the previously provided restoration error is determined, if the specific application belongs to a preset white list, detailed application information related to the specific application may be restored in the restoration target terminal. Moreover, in performing the restoration operation, when the previously provided restoration error is determined, if the specific application does not belong to the preset white list, the data for the specific application may not be restored in the restoration target terminal.

Preferably, in the determining, a case that a version of the specific application previously installed on the restoration target terminal before the restoration is equal to that of the specific application installed on the backup target terminal may be determined as the previously provided restoration error. And, in performing the restoration operation, when the previously provided restoration error is determined, the specific application may not be restored in the restoration target terminal but a detailed application information for the specific application may be restored in the restoration target terminal.

Preferably, the backup target terminal may manage an application restricted from operating in the restoration target terminal using a blacklist. And, in the determining, if the specific application installed on the backup target terminal is the application corresponding to the blacklist, the previously provided restoration error may be determined. Moreover, during the backup, the application corresponding to the blacklist may not be backed up but information on the blacklist may be backed up.

More preferably, in performing the restoration operation, if the previously provided restoration error is determined, the specific application of a version operable in the restoration target terminal from an external server may be installed on the restoration target terminal using the information on the blacklist.

Preferably, the restoration target terminal may include a terminal identical to the backup target terminal.

Preferably, the restoration target terminal may be configured to operate by a same operating system of a version different from that of the backup target terminal.

Preferably, the restoration target terminal may include a terminal different from the backup target terminal.

In a further aspect of the present invention, a mobile terminal according to an example embodiment of the present invention may include a wireless communication unit receiving a backup information on a backup of data of at least one application of a backup target terminal and a controller restoring the data for the at least one application, the controller performing a basic restoration operation on the data related to the at least one application based on the backup information, the controller determining whether a previously provided restoration error occurs in a data restoring process for a specific application among the at least one or more applications, the controller performing a restoration operation corresponding to the restoration error in accordance with a result of the determination.

Preferably, the mobile terminal may further include a display unit configured to display an indicator window configured to indicate a process for performing the restoration operation related to the at least one application.

Preferably, the controller may determine a case that the specific application installed on the backup target terminal does not exist in the restoration target terminal as the previously provided restoration error. And, if the previously provided restoration error is determined, the controller may install the specific application and restore detailed application information related to the specific application at a timing point of completing the installation.

Preferably, the controller may determine a case that a version of the specific application previously installed on the restoration target terminal before the restoration is more recent than that of the specific application installed on the backup target terminal as the previously provided restoration error. And, when the previously provided restoration error is determined, if the specific application belongs to a preset white list, the controller may restore a detailed application information related to the specific application in the restoration target terminal. Moreover, when the previously provided restoration error is determined, if the specific application does not belong to the preset white list, the controller may not restore the data for the specific application in the restoration target terminal.

Preferably, the controller may determine a case that a version of the specific application previously installed on the restoration target terminal before the restoration is equal to that of the specific application installed on the backup target terminal as the previously provided restoration error. And, when the previously provided restoration error is determined, the controller may not restore the specific application in the restoration target terminal but may restore detailed application information for the specific application in the restoration target terminal.

Preferably, the wireless communication unit may receive blacklist information as information on an application restricted from operating in the mobile terminal from the external server. And, if the specific application installed on the backup target terminal is the application corresponding to the blacklist information, the controller may determine the previously provided restoration error. Moreover, if the previously provided restoration error is determined, the controller may install the specific application of a version operable in the mobile terminal from the external server on the mobile terminal using the blacklist information.

It is to be understood that both the foregoing general description and the following detailed description are exemplary embodiments and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate various example embodiment(s) of the invention and together with the description serve to explain the principle of the invention. In the drawings.

DETAILED DESCRIPTION

Reference will now be made in detail to the various example embodiments of the present invention which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an example embodiment described in this disclosure is applicable to such a stationary terminal as a digital TV, a desktop computer and the like.

Figure 1:
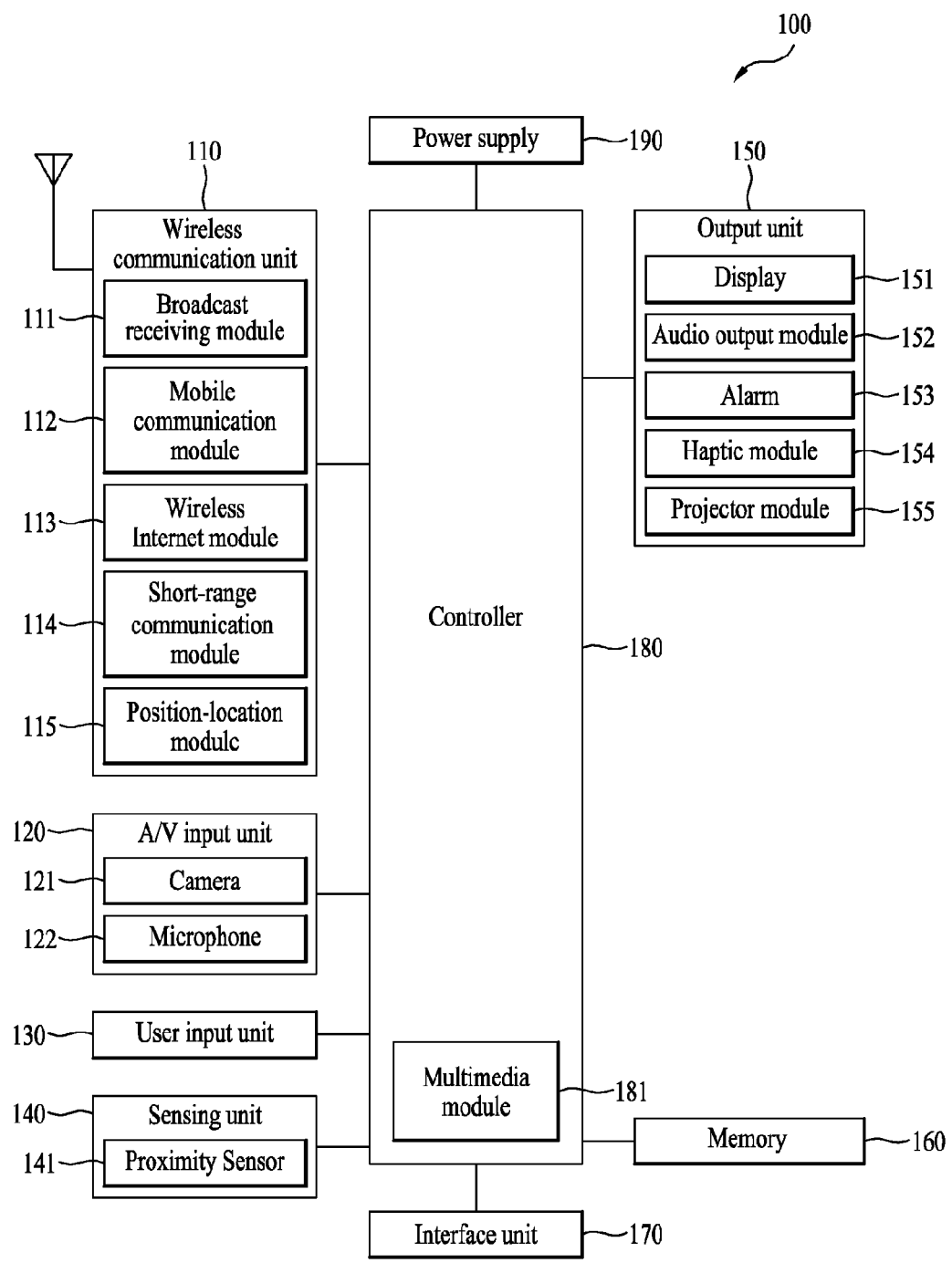
FIG. 1 is a block diagram of a mobile terminal according to one example embodiment of the present invention.

FIG. 1 is a block diagram of a mobile terminal according to one example embodiment of the present invention.

Referring to FIG. 1, a mobile terminal 100 according to one example embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

In case that the display unit 151 and a sensor for detecting a touch action (hereinafter called 'touch sensor') configures a mutual layer structure (hereinafter called 'touchscreen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various example embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Compared to the conventional portable devices, a recent terminal achieves considerable development and becomes capable of performing various functions used to be performed by a computer. To keep up with such development, the recent terminal starts to be loaded with a terminal operating system (OS) like a computer operating system, which is not loaded on the conventional portable devices. In particular, types of terminals are diversified by depending on what kind of terminal operating system is loaded thereon, which causes advantages or disadvantages to each of the terminals. And, an application installable on a terminal may vary in accordance with an operating system of the terminal.

So far, the terminal operating systems may be mainly categorized into iOS™ loaded on iPhone™, Android™ OS loaded on Android™ Phone, Windows Mobile™ OS loaded on Windows Mobile™ Phone, Blackberry™ OS by RIM™, Symbian™ OS by Nokia™, Bada™ OS by Samsung™ and the like in accordance with terminal manufacturers.

Alternatively, the terminal operating systems may be categorized by an open operating system or a closed operating system. In particular, the open operating system is not created for the commercial purpose, its source codes are open to the public free of charge, and everyone is allowed to participate in improving or creating the open operating system. On the contrary, the closed operating system is created for the commercial purpose, its source codes are not open to the public free of charge, and authorized persons are only allowed to participate in improving or creating the closed operating system. For example, Android™ OS, Symbian OS and the like belong to the category of the open OS.

In the following description, various example embodiments are explained with reference to an open operating system for a terminal. For clarity and convenience of the following description, an Android™ operating system is taken as an example of the open operating system. Yet, it is apparent to those skilled in the art that the present invention is applicable to other open operating systems.

Figure 2:
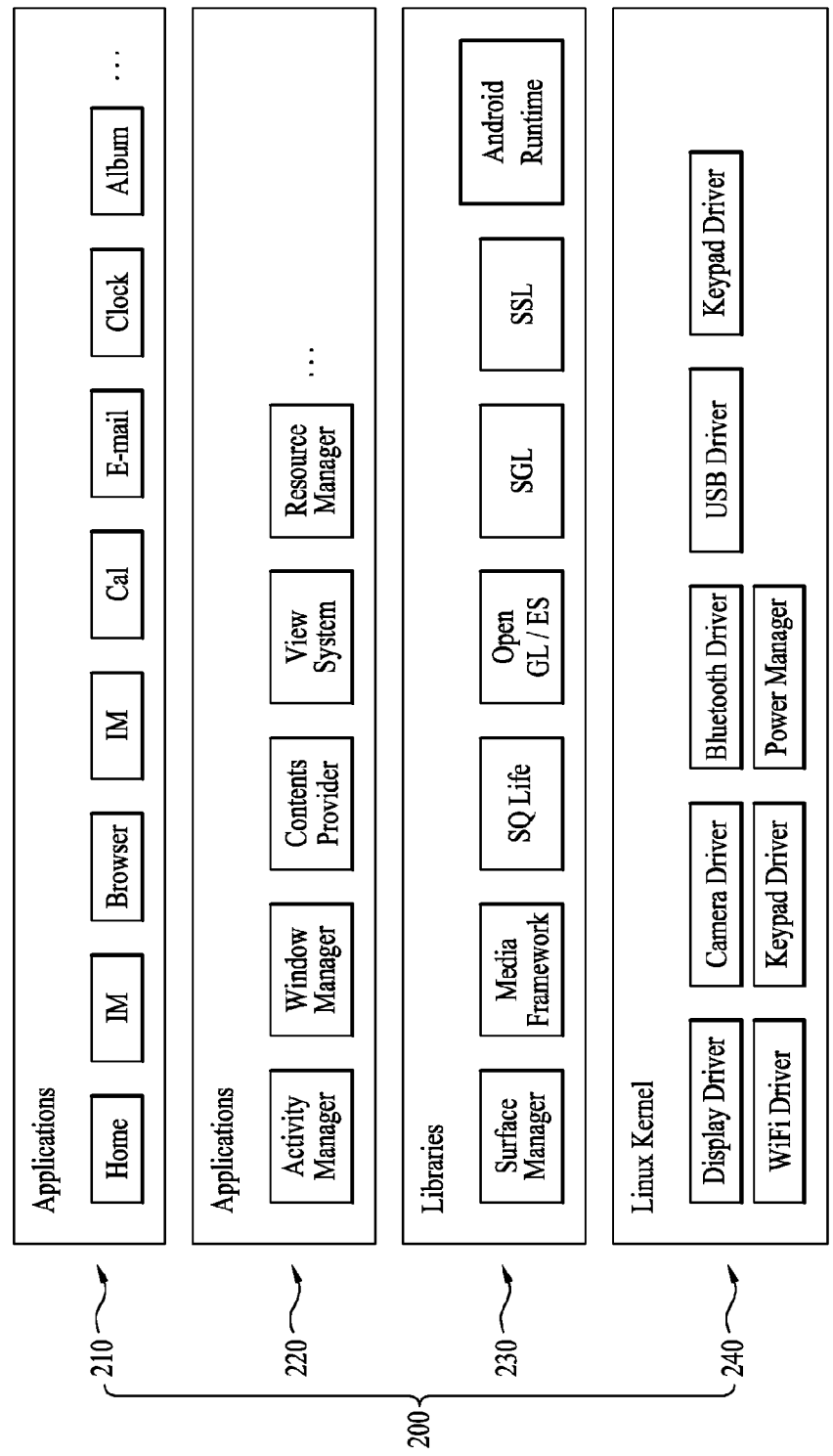
FIG. 2 is a diagram of a structure of Android™ platform as an open operating system.

FIG. 2 is a diagram of a structure of Android™ platform as an open operating system.

Referring to FIG. 2, Android™ platform 200 is created on the basis of Android™ OS. The Android™ platform 200 is the software stack or mobile operating system that contains an operating system for such a portable device as a mobile terminal, a mobile phone and the like, a middle ware for the portable device, a user interface, a standard application program (e.g., a web browser, an email client, a short message service (SMS), a multimedia message service (MMS), etc.) and the like. The Android™ enables a developer to create an application program with Java™ Language and provides a runtime library for driving byte codes. And, the Android™ provides various tools required for developing application programs and application program interfaces (API) via Android™ software development kits (SDK).

The Android™ operates on Linux kernel and includes C/C++ libraries used for various Android™ system configuration elements. The Android™ is configured to execute Java™ application program in a separate process via Dalvik virtual machine different from a conventional Java virtual machine.

The Android™ platform 200 may be mainly divided into 4 parts as follows.

First of all, a 1$^{st}$ layer includes a Linux kernel 240 in charge of an H/W and internal memory management, a process management and a networking management. Through the Linux kernel 240, the Android™ platform 200 may correctly operate in H/W.

A 2$^{nd}$ layer includes a library layer 230 constructed by C or C++ and provides a function to use H/W for a terminal. For representative example of the library layer 230, there are a graphic library for graphic implementation and a media codec for video playback. And, DalVik VM, which is the runtime for activating Java™ application, is installed on the Android™ platform 200.

A 3$^{rd}$ layer includes an application framework layer 220 that provides functions required for creating Android™ applications. The application framework layer 220 provides API (application programming interface). And, an Android™ application developer may be able to implement necessary functions using the API.

And, a 4$^{th}$ layer includes a most upper application layer 210, in which applications used by a user are arranged. If an application developer distributes an application, the distributed application is included in the 4$^{th}$ layer and may have a position equivalent to that of a basic Google™ application installed on a terminal as a default.

In the following description, a backup and restoration method in a terminal having Android™ OS (hereinafter abbreviated Android™ OS terminal) is explained.

First of all, a terminal having a plurality of open operating systems including Android™ OS and the like provides a backup and restoration function to safely protect a plurality of data installed on the terminal.

In general, a backup and restoration method in the Android™ OS terminal may be performed in a manner of activating a backup restoration application. Various functions can be performed via a plurality of applications installed on the Android™ OS terminal and the backup restoration application may be included in a plurality of the applications.

In case of activating a backup restoration application, a target to be backed up and restored in the backup restoration application is selected and the corresponding target files or applications are saved in a 3$^{rd}$ storage place (e.g., an external server, an external storage device, etc.) or a memory. Thereafter, in case that the backup content needs to be restored or installed again on the Android™ OS terminal, it may be able to restoration by activating a backup restoration application based on the saved backup content.

When a backup restoration process is performed by activating the backup restoration application, backup targets may include applications installed on the terminal, detailed application information related to each of the applications, configuration informations on applications arranged or sorted in the terminal, and the like.

For instance, assume that a text application, a call application and a game application are installed on a terminal. On this assumption, if a backup restoration application is activated, data of each of the text, call and game applications is saved. In this case, data of various texts exchanged with a plurality of counterpart terminals, which are the detailed application informations related to the text application, can be saved in an external storage device by the backup restoration application. And, informations on calls with a plurality of counterpart terminals, which are the detailed application informations related to the call application, can be saved in an external storage device by the backup restoration application. Moreover, loading status information related to a progress level of each game, which is the detailed application information related to the game application, can be saved in an external storage device by the backup restoration application.

In the Android™ terminal, applications can be variously edited on a background image, whereby the edited applications can be displayed on a display unit of the terminal in various arrangement forms. And, configuration information related to this arrangement state may be saved in an external device by the backup restoration application.

The data or informations saved by the backup restoration application may be restored in the same terminal or a terminal of a different version automatically or user-selectively.

Meanwhile, the detailed application information is saved in the memory 160, and more particularly, in a file system separate from the corresponding application due to a software structure. And, an authority of access to the detailed application information saved in the file system may be granted to the application related to the corresponding detailed application information only. For instance, detailed call application information related to a call log may be read and saved in a manner of being accessed by the call application only.

Basically, in the backup restoration process, a backup restoration application is not allowed to access detailed application information of another application. Hence, even if the backup restoration application performs the backup restoration process, it may be unable to completely restore the detailed application information. Exceptionally, a program having a root authority of accessing all applications may be only able to access detailed application information on a specific application.

In case that an authority of accessing detailed application information on a different application is granted to a specific application, since it may be vulnerable to hacking, the root authority is not normally granted to an individual application.

Therefore, in order to exactly back up and restore all data installed on a terminal, i.e., a corresponding application, detailed application information and configuration information, at a user-specific level via a backup restoration application, it may be requested to use a root authority for accessing a different application.

According to an example embodiment of the present invention, in order to perform a backup restoration process via a backup restoration application, a backup restoration service having a root authority is loaded in advance and the backup restoration application is then enabled to perform the backup and restoration in a manner of accessing a detailed application information on an individual application.

Figure 3A:
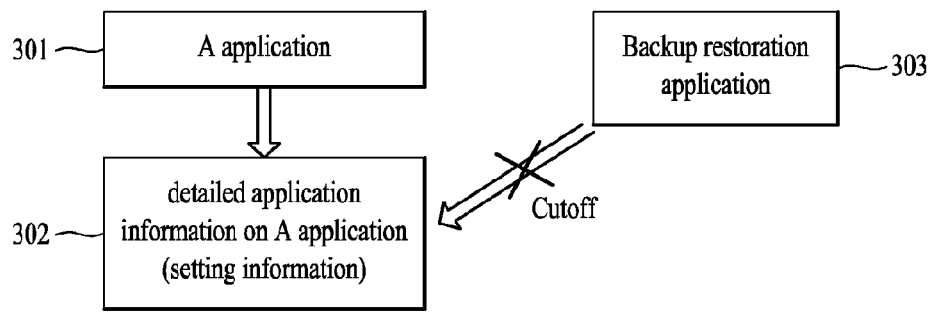
FIG. 3A is a diagram for an access scheme via a backup restoration application according to a related art.

FIG. 3A is a diagram for an access scheme via a backup restoration application according to a related art. And, FIG. 3B is a diagram for an access scheme via a backup restoration application according to an example embodiment of the present invention.

Referring to FIG. 3A, each application 301 may be able to access detailed application information 302 on the corresponding application but a backup restoration application 303 for the backup of the corresponding application is unable to access the detailed application information. Hence, even if the backup and restoration is completed, the detailed information on the corresponding application may not be restored.

Figure 3B:
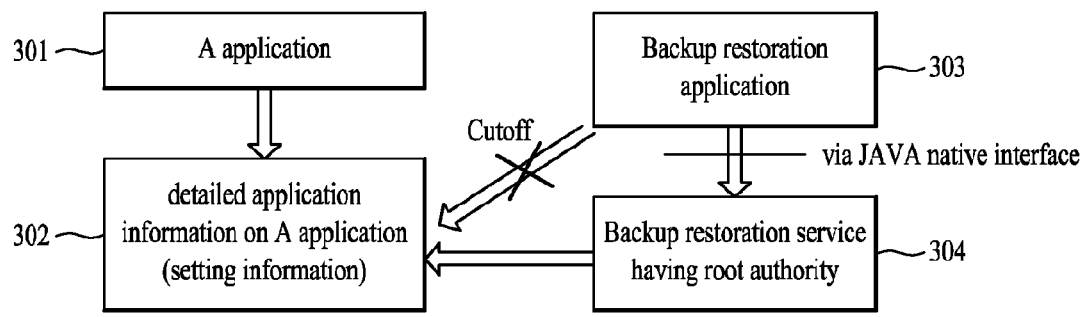
FIG. 3B is a diagram for an access scheme via a backup restoration application according to an example embodiment of the present invention.

Referring to FIG. 3B, each application 301 may be able to access detailed application information 302 on the corresponding application but a backup restoration application 303 for the backup of the corresponding application is still unable to access the detailed application information in direct. Yet, according to an example embodiment of the present invention, the backup restoration application 303 checks the detailed application information 302 via a backup restoration service 304 having a root authority instead of directly accessing the detailed application information 302 and may be then able to back up and restore the corresponding information.

In particular, according to an example embodiment of the present invention in association with FIG. 3B, a detailed application information, which is not accessible by a backup restoration application according to a related art, on each application is accessed via a backup restoration service having a root authority for the corresponding application and the corresponding information can be backed up and restored.

Figure 4:
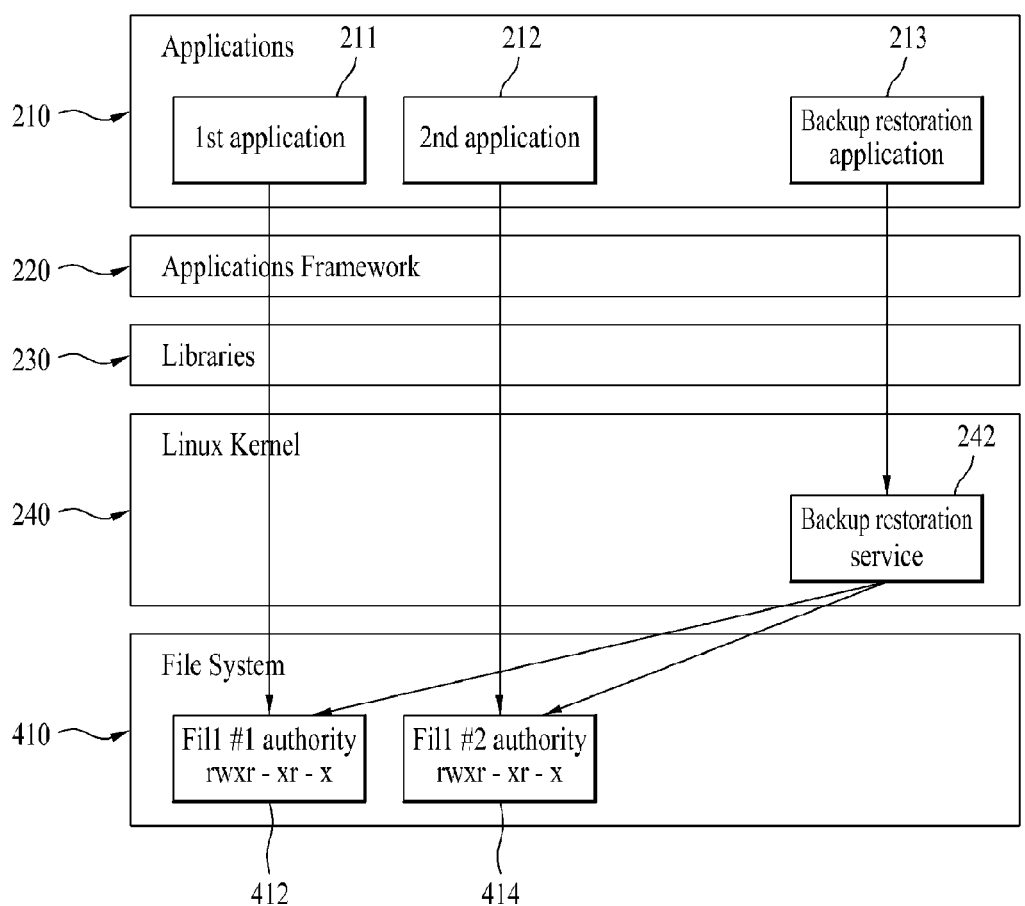
FIG. 4 is a schematic diagram of a process for a backup restoration application to access data via a backup restoration service according to an example embodiment of the present invention.

FIG. 4 is a schematic diagram of a process for a backup restoration application to access data via a backup restoration service according to an example embodiment of the present invention.

Referring to FIG. 4, a plurality of applications including a 1$^{st}$ application 211, a 2$^{nd}$ application 212 and a backup restoration application 213 exist in an application layer 210 of an Android™ platform.

In particular, the 1$^{st}$ application 211 is able to freely read and save a file #1 412 in a file system 410 by accessing the file #1 412 as a detailed application information on the 1$^{st}$ application 211. And, the 2$^{nd}$ application 212 is able to freely read and save a file #2 414 in the file system 410 by accessing the file #2 414 as a detailed application information on the 2$^{nd}$ application 212. Yet, as mentioned in the foregoing description, an authority for directly accessing each of the detailed application informations 452 and 454 is not granted to the backup restoration application 213 for the backup and restoration of each of the 1$^{st}$ application 211 and the 2$^{nd}$ application 212.

When the mobile terminal 100 according to an example embodiment the present invention performs the backup restoration application 213, the backup restoration application 213 may be able to access the file system 410 via a backup restoration service 242 of a Linux layer 240 and may be then able to back up and restore the detailed application informations 412 and 414.

Figure 5:
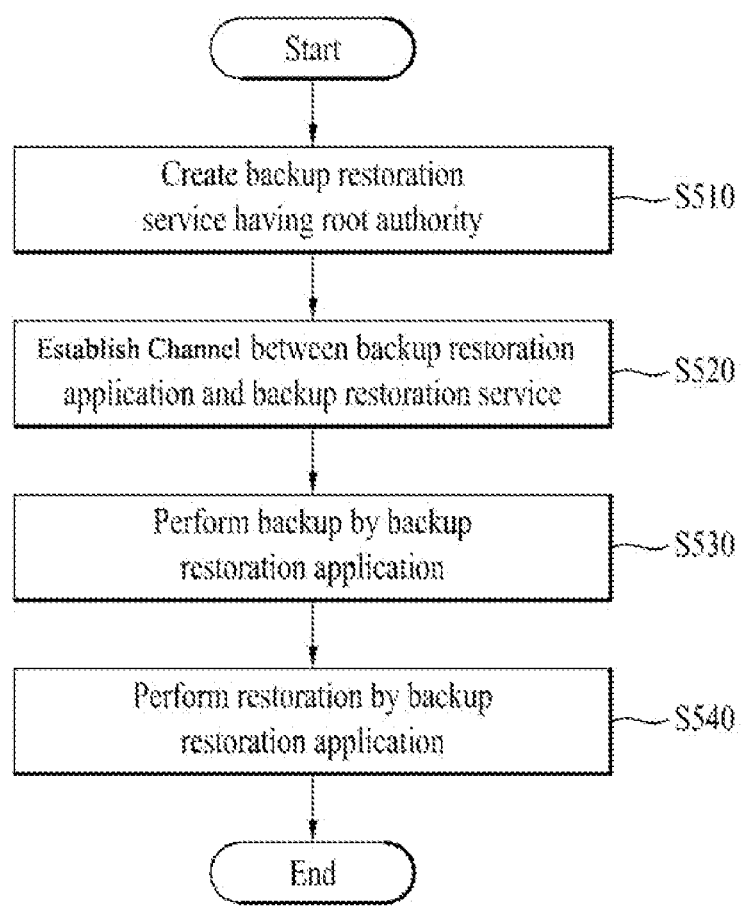
FIG. 5 is a schematic flowchart for a terminal data backup and restoration method according to an example embodiment of the present invention.

FIG. 5 is a schematic flowchart for a terminal data backup and restoration method according to an example embodiment of the present invention.

Referring to FIG. 5, the controller 180 creates a backup restoration service having a root authority [S510]. The controller 180 establishes a channel between the created backup restoration service and a backup restoration application [S520]. The controller 180 activates the backup restoration application and then performs a backup operation on data [S530]. The controller 180 performs a restoration operation on the mobile terminal 100 via the active backup restoration application.

In the following description, based on the flowchart for the backup restoration method described with reference to FIG. 5, an example embodiment of the present invention is explained.

First of all, the controller 180 creates a backup restoration service having a root authority [S510].

Regarding the creation of the backup restoration service, a procedure in an init process is described. In this case, a mode process operating on Linux is created and activated in the init process. According to an example embodiment of the present invention, a root authority for accessing detailed application information on each application can be performed not in an application layer but in a Linux layer. Hence, a process for the Linux layer to grant the root authority is required.

Roles played in the init process may be schematically categorized into init.rc file analysis and activation, device driver node creation, end processing of a detailed process, property service termination and the like.

In particular, the init.rc file is the filed used in the init process and defines a service and an action. According to an example embodiment of the present invention, in order to grant a root authority to a backup restoration application, a root authority granted content may be added to the init.rc file.

The action defined in init.rc may mean such a function automatically executed in case of an init process activation as export, mkdir and the like. And, the service defined in init.rc may mean a process executed by the init process.

According to an example embodiment of the present invention, in order to execute a backup restoration service having a root authority, a backup restoration service for a backup restoration application is defined in the init.rc.

In particular, in order for a backup restoration application to execute a backup restoration service having a root authority for a backup, the backup restoration service is performed in a grammar format as follows.

service linkbackupd/system/xbin/linkbackupd
    socket linkbackup stream 660 root radio
    user root
    group root The above grammar is exemplarily shown to execute a backup restoration service having a backup root authority. Hence, when the above content is described in the init.rc, the backup restoration service having the root authority can be executed or created in the backup restoration process through the corresponding content. According to the grammar for the backup restoration service, each new service is executed. When the service is executed, a socket is created. And, a channel of communication with an application is established using the created socket.

After the backup restoration service has been created, the controller 180 establishes a channel between the created backup restoration service and the backup restoration application [S520].

Thus, after the backup restoration service having the rot authority has been created via the init process, the socket for the channel establishment between the backup restoration service and the backup restoration application is created.

Figure 6:
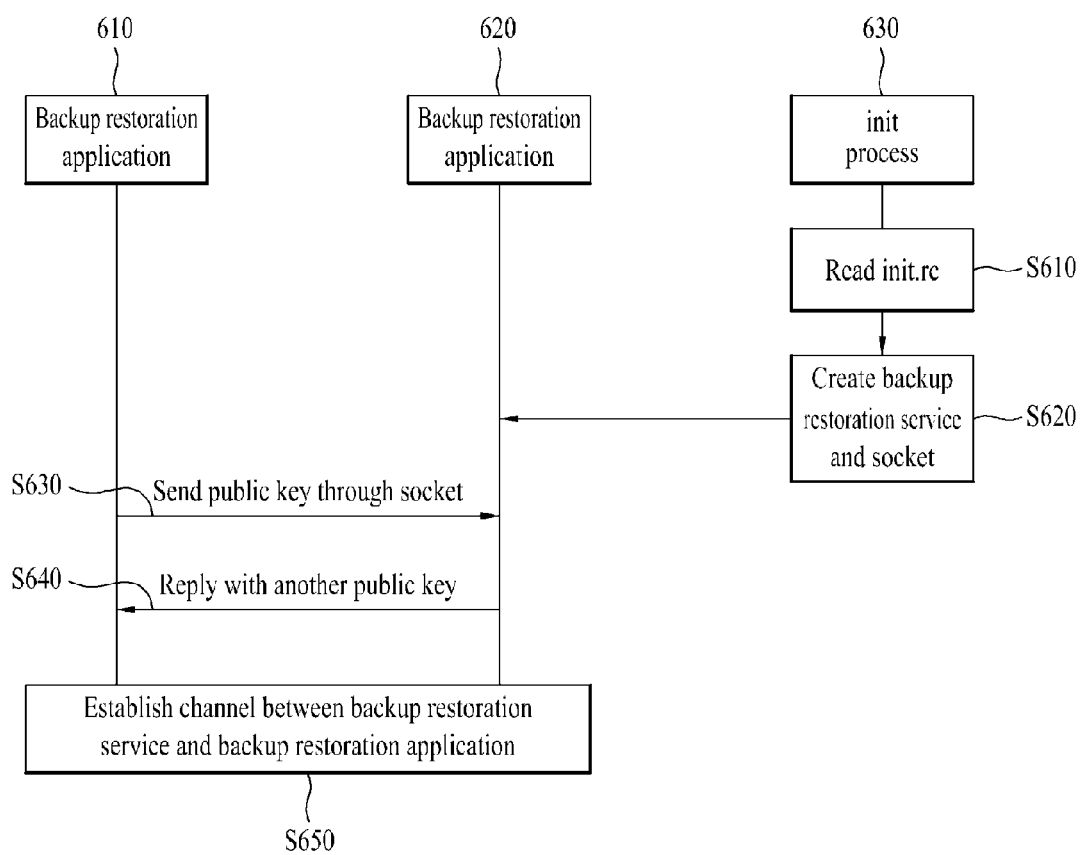
FIG. 6 is a schematic diagram of a process for establishing a channel between a backup restoration service and a backup restoration application via a socket according to an example embodiment of the present invention.

FIG. 6 is a schematic diagram of a process for establishing a channel between a backup restoration service and a backup restoration application via a socket according to an example embodiment of the present invention.

Referring to FIG. 6, init.rc is red via the process of an init process 630 [S610]. A backup restoration application 620 is created as described in the init.rc and a socket is created [S620]. In this case, the socket is a means for connecting communication between the backup restoration service and a backup restoration application 610. The backup restoration application 610 delivers a public key to the backup restoration service 620 via the socket [S630]. In response to the delivered public key, the backup restoration service 620 replies with another public key [S640]. Through this procedure, a channel is established between the backup restoration service and the backup restoration application.

In case that the channel is established between the backup restoration service and the backup restoration application, as mentioned in the foregoing description, the backup restoration application may be able to access a detailed application information on each application and may be then able to backup and restore the accessed detailed application information.

After the channel has been established between the backup restoration service and the backup restoration application, the backup restoration application performs a backup operation [S530].

When the backup restoration application is activated, as mentioned in the foregoing description, it is assumed that the detailed informations are accessible in a manner of accessing a file system via the backup restoration service.

The backup restoration application may be able to perform the backup operation by periods. As mentioned in the foregoing description, the backup operation may save data related to the terminal 100 in an external storage device or the memory 160 of the terminal 100. Optionally, only if a user selects to activate the backup restoration application, the backup operation may be performed.

With respect to the backup operation, a user may be able to select a target to back up. In particular, in case that the backup restoration application is activated for a backup operation initiation, all data related to the terminal 100 (e.g., applications, detailed application informations, configuration informations, etc.) may be displayable. And, the backup operation may be performed on the data selected from the displayed data.

With respect to the backup restoration application, a target not to be backed up may be managed using a blacklist. For instance, in case that applications are usable for a specific terminal type only, even if the applications are backed up and restored, they may not be correctly operable in the restored terminal. This specific data is managed using the blacklist and may be selected as an exception of the backup target. And, the blacklist may be saved in the memory 160. The controller 180 may be able to automatically determine and manage the data belonging to the blacklist. Yet, even if the data are managed using the blacklist, summary information on the application corresponding to the blacklist may be saved.

With respect to the backup restoration application, a target to be necessarily backed up may be managed using a white list. Hence, data (e.g., application, etc.) managed using the white list may be automatically backed up despite not being selected as a backup target by a user.

After the backup operation has been performed, the backup restoration application performs a restoring process [S540].

With respect to the restoring process, the backup restoration application may be able to perform the process using the root authority via the backup restoration service, if necessary.

Figure 7:
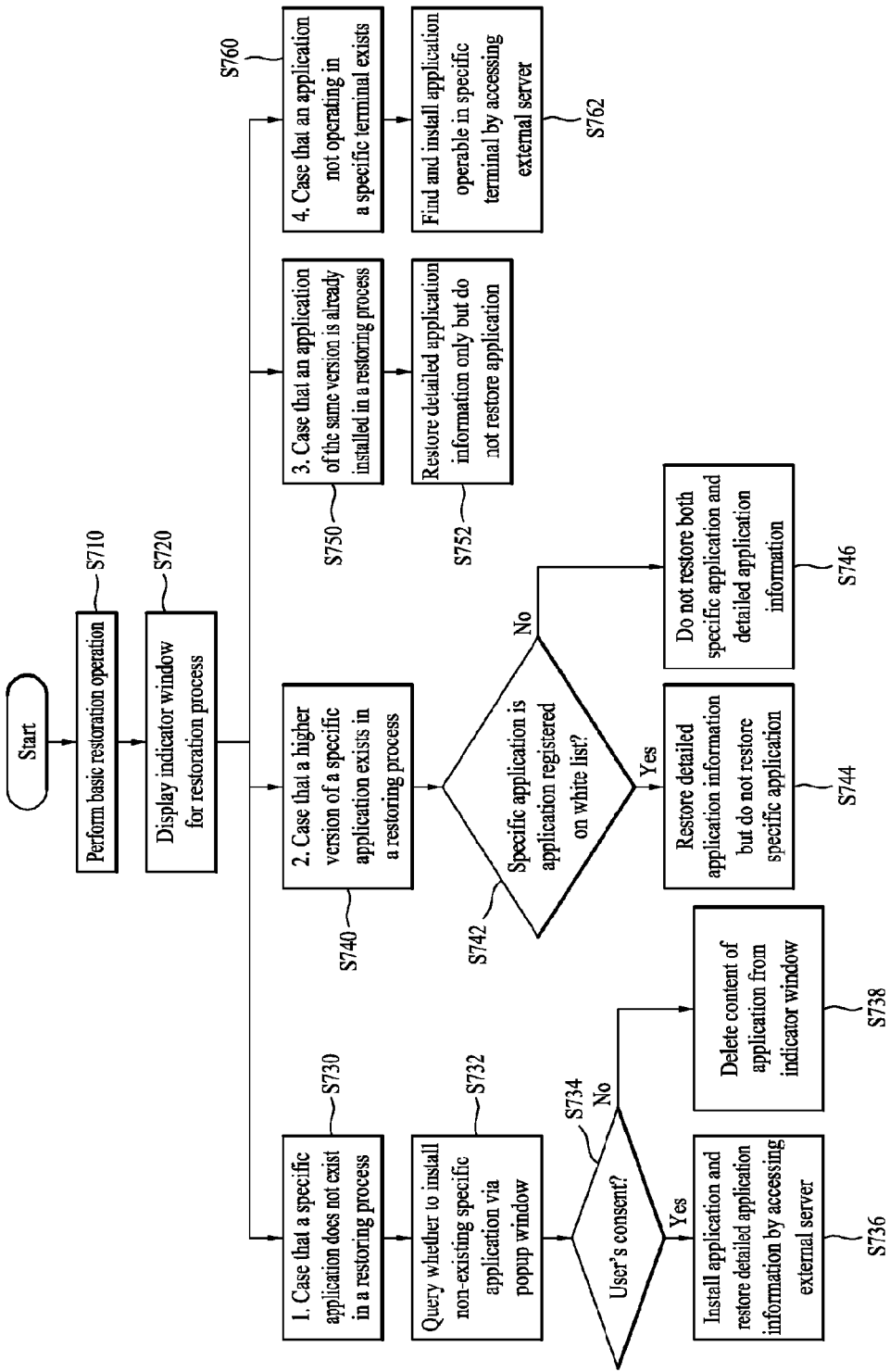
FIG. 7 is a flowchart for a detailed case related to a restoration operation via backup restoration application according to an example embodiment of the present invention.

FIG. 7 is a flowchart for a detailed case related to a restoration operation via backup restoration application according to an example embodiment of the present invention.

According to an example embodiment of the present invention, performing the restoring process 5540 may include the sub-operations shown in FIG. 7.

Referring to FIG. 7, a backup restoration application performs a basic restoration operation [S710]. With respect to the basic restoration operation, the backup restoration application may be able to restore information using a backup restoration service having a root authority.

The backup restoration application may display an indicator window related to the restoration operation [S720]. Thereafter, the backup restoration application may determine one of the following four cases as a restoration error and may be able to perform a restoration operation on each restoration error. The cases provided as the restoration errors can be categorized into: 1) a case that a specific application does not exist in a restoring process [S730]; 2) a case that a higher version of a specific application exists in a restoring process [S740]; 3) a case that an application of the same version is already installed in a restoring process [S750]; and 4) a case that an application not operating in a specific terminal exists [S760].

First of all, the indicator window display for the restoring process is described with reference to FIG. 8 as follows.

Figure 8:
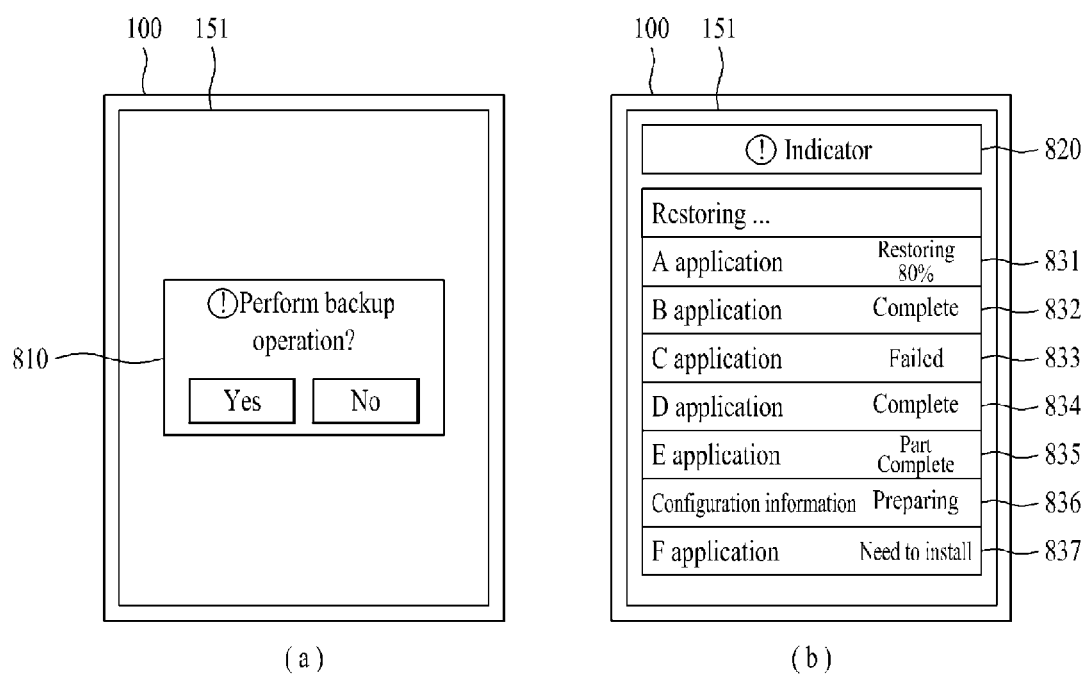
FIG. 8 is a diagram of an indicator window related to a restoration operation according to an example embodiment of the present invention.

FIG. 8 is a diagram or displaying an indicator window related to a restoration operation according to an example embodiment of the present invention.

Referring to FIG. 8 (a), the display unit 151 may display a window for inquiring a user whether to perform a backup restoration operation. With respect to performing the backup restoration operation, the terminal 100 may initiate the backup or restoration operation in accordance with a selection made by a user, which depends on the user's selection. And, a user's intention may be queried in association with the user's selection.

Referring to FIG. 8 (b), the display unit 151 may display an indicator window 820 displayed if the restoration operation is initiated by activating the backup restoration application.

The indicator window 820 related to the restoration operation may continue to be displayed while the restoring process is performed. Alternatively, the indicator window 820 may be displayed only if the restoration operation is completed.

The indicator window 820 may display a restoration result or a restoration status of data which are the restoration targets of the backup restoration application. For instance, the indicator window 820 may indicate such a restoration status as a restoration result completion, a restoration preparation in progress, a restoration failure, a partial restoration completion, an installation necessity and the like.

With respect to the indicator window 820 shown in FIG. 8 (b), for example, a restoring process for an A application 831 is in progress up to 80% and a restoring process for a B application 832 or a D application 834 is completed. Moreover, a C application 833 has failed in restoration. For another example, a case of a restoration preparation in progress or a case of an installation necessity may exist.

If each of a plurality of applications or data displayed on the indicator window 820 is selected, it may be able to display information on the corresponding application or data. For instance, if an E application 835 displayed on the indicator window 820 is selected, it may be able to additionally display detailed information indicating which portion of the E application is restored or not.

In the following example embodiments of the present invention, the four kinds of operations provided as restoration errors are explained in detail with reference to FIGS. 9 to 12.

First of all, in the restoring process, since a terminal environment in the course of a backup may differ from a terminal environment in the course of a restoration, the present invention may be able to perform the following exemplary operations.

First of all, the 1$^{st}$ restoration error, i.e., the case that a specific application does not exist in a restoring process [S730] is described with reference to FIG. 9 as follows.

In case that a specific application is not installed in the restoring process, there is a problem that it is unable to restore detailed application information on the specific application. Hence, according to an example embodiment of the present invention, a following procedure is performed in case that a specific application does not exist in a restoring process.

First of all, the case that a specific application does not exist in a restoring process is described as follows.

Figure 9:
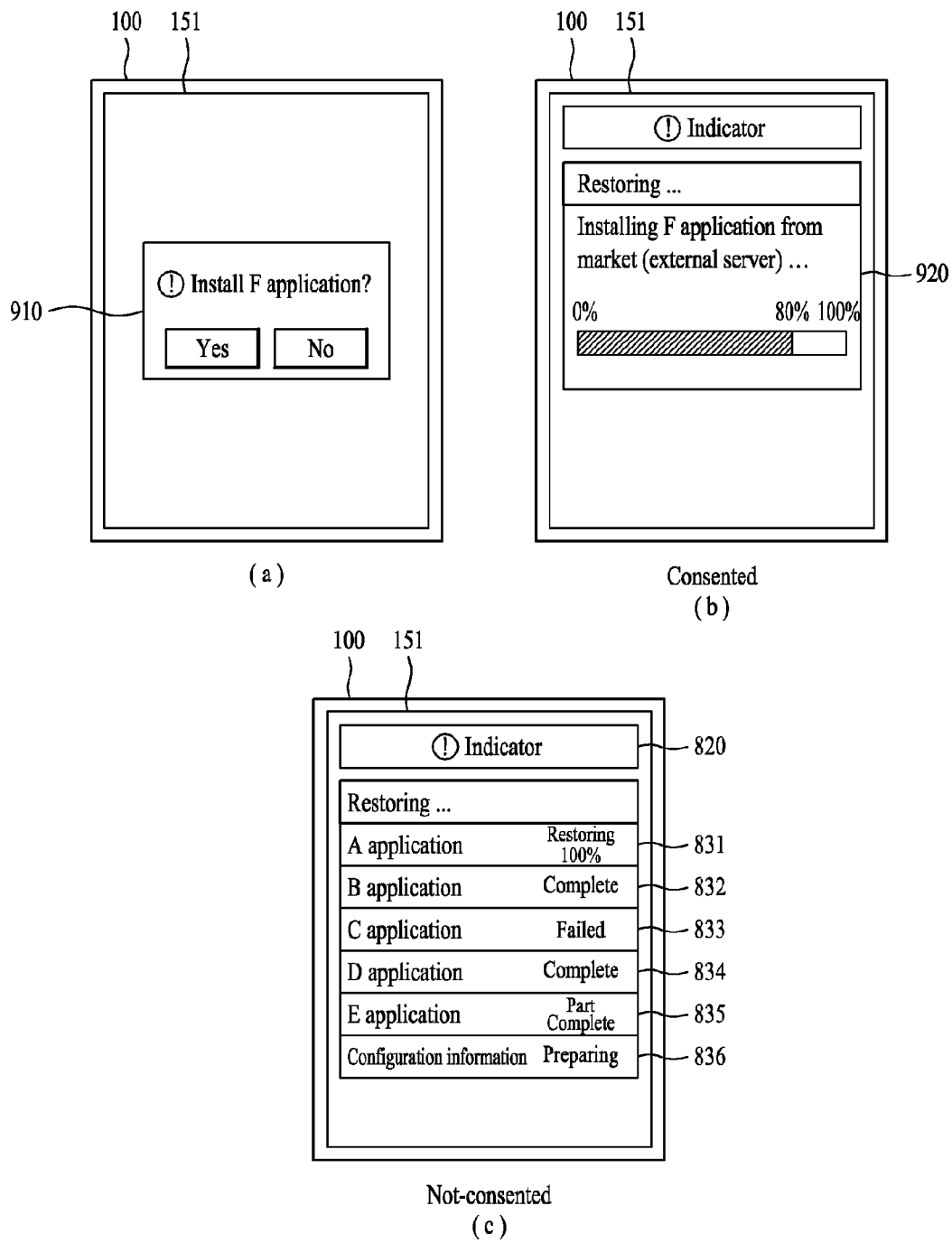
FIG. 9 is a diagram for a $1^{st}$ case of a restoration error occurrence according to an embodiment of the present invention.

FIG. 9 is a diagram for a 1$^{st}$ case of a restoration error occurrence according to an example embodiment of the present invention.

Referring to FIG. 9 (a), in case that a specific application does not exist, the controller 180 may ask a user whether to install the non-existing specific application via the display unit 151 [S732]. In particular, the display unit 151 may query a user's intention via a query window 910.

The controller 180 checks whether a user's consent to whether to install the corresponding application via the query window 910 [S734].

Referring to FIG. 9 (b), if the user gives his consent to install the corresponding application [S736], the backup restoration application may be able to install the corresponding application downloaded from an external server via the wireless communication unit 110. In this case, the external server may mean such a server capable of delivering applications as Android™ market and the like.

Meanwhile, if the corresponding application delivered from the external server is installed, the backup restoration application may be able to restore detailed application information on the corresponding application.

Referring to FIG. 9 (c), if the user selects not to install the corresponding application [S738], the backup restoration application deletes the information on the corresponding application from the display window 820. Compared to the former display window 820 shown in FIG. 8 (b), the latter display window 820 shown in FIG. 9 (c) displays that the F application 837, which needed to be installed, is deleted.

In the following description, the $2^{nd}$ restoration error, i.e., the case that a higher version of a specific application exists in a restoring process [S740] is explained with reference to FIG. 10 as follows.

Figure 10:
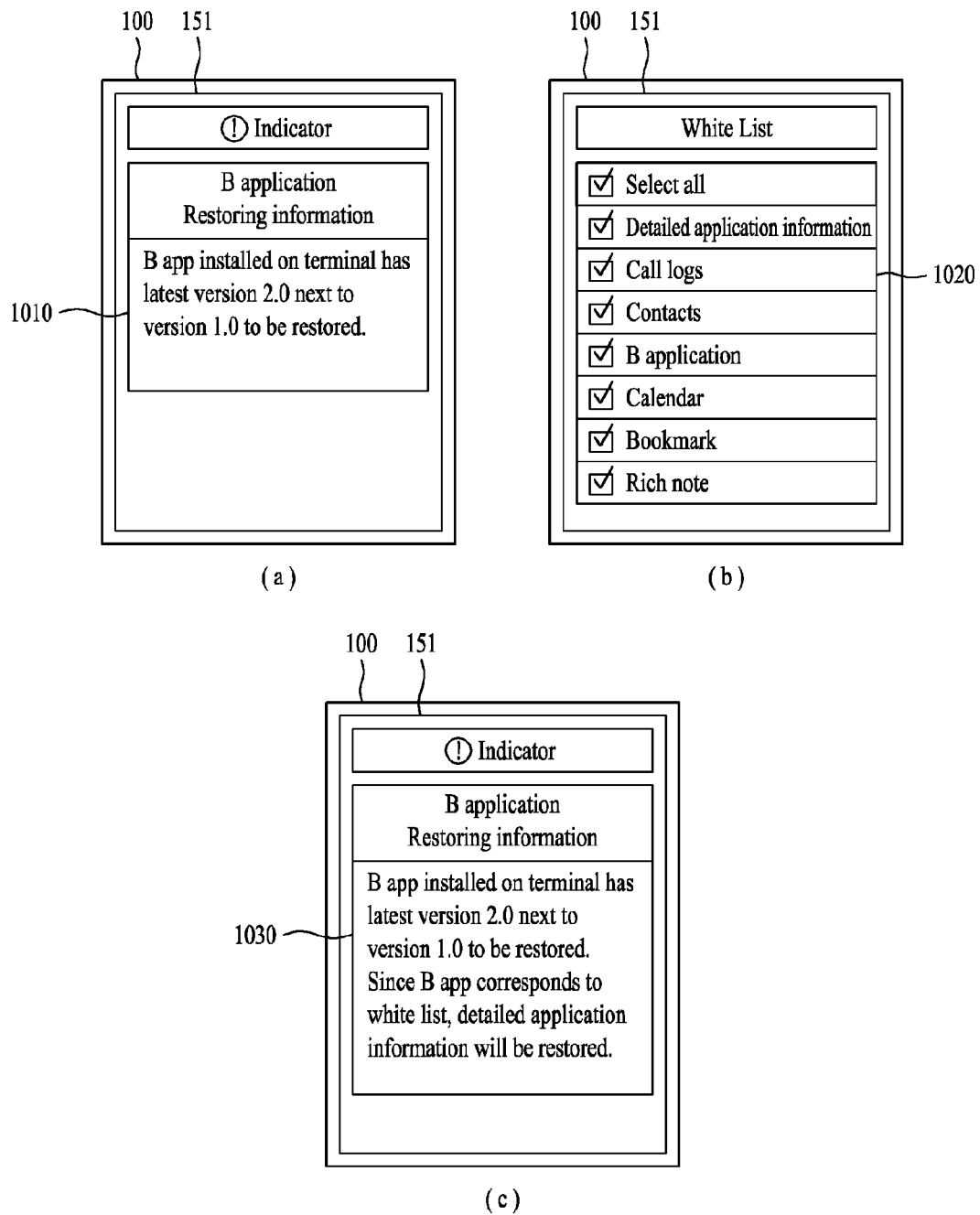
FIG. 10 is a diagram for a $2^{nd}$ case of a restoration error occurrence according to an example embodiment of the present invention.

FIG. 10 is a diagram for a $2^{nd}$ case of a restoration error occurrence according to an example embodiment of the present invention.

Referring to FIG. 10, if a version of a specific application installed on a terminal in a restoring process is higher than that of a version to be restored, the backup restoration application may perform the following procedure.

Referring to FIG. 10 (a), if necessary, the backup restoration application may indicate that a version of a specific application currently installed on a terminal is more recent than that of a version to be restored via a display window 1010.

In this case, since the version currently installed on the terminal is a latest version, the version of the application to be restored is not restored basically. Yet, in case that the corresponding specific application is the application corresponding to a white list, it may be handled in a different manner.

Referring to FIG. 10 (b), the display unit 151 displays a white list 1020. In this case, as mentioned in the foregoing description, the white list relates to the category of targets that should be backed up in the backup process and may include the targets that should be restored in the restoring process as well. In the drawing, the B application may correspond to the white list.

Referring to FIG. 10 (c), regarding data or application categorized into the white list, if a latest version is installed on the terminal, it may be able to restore detailed application information on the corresponding application [S744]. In particular, since a version of the application itself is a higher version, it may not be restored. Yet, the detailed application information on the application may be restored only if it corresponds to the white list.

Meanwhile, an application, of which compatibility with a higher version of an application has been verified, may be set to be registered on the white list.

In the following description, the $3^{rd}$ restoration error, i.e., the case that an application of the same version is already installed in a restoring process [S750] is described with reference to FIG. 11 as follows.

In the corresponding restoring process, if the same version of the same application is already installed on the terminal 100, it may be unnecessary to perform a process for re-installing the corresponding application. Hence, in this case, it may be requested to only determine whether to restore detailed application information on the corresponding application.

Figure 11:
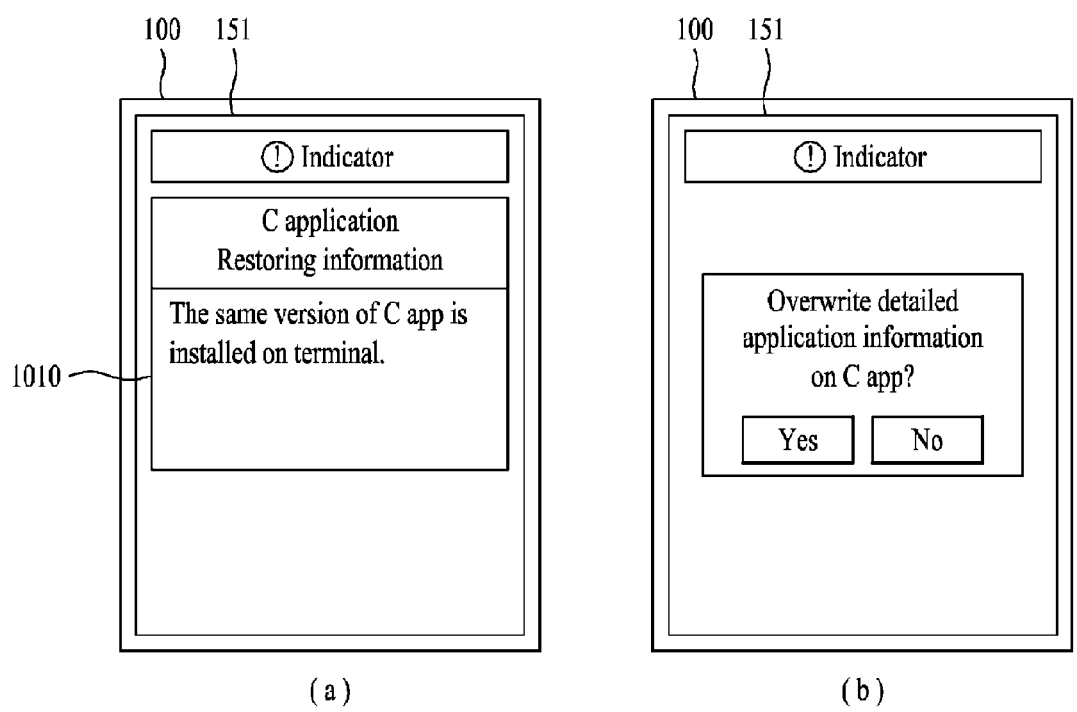
FIG. 11 is a diagram for a $3^{rd}$ case of a restoration error occurrence according to an example embodiment of the present invention.

FIG. 11 is a diagram for a 3rd case of a restoration error occurrence according to an example embodiment of the present invention.

Referring to FIG. 11 (a), the backup restoration application may be able to indicate that the same application of the same version is already installed on the terminal via the display unit 151.

In this case, the backup restoration application may be able to restore detailed application information on the corresponding application only and may be able to ask a user about this restoring process. Referring to FIG. 11 (b), a user is asked about whether to overwrite detailed application information. Only if the user selects 'yes', the detailed application information can be restored in the terminal via the overwriting.

Finally, the $4^{th}$ restoration error, i.e., the case that an application not operating in a specific terminal exists [S760] is described with reference to FIG. 12 as follows.

First of all, in case of perform backup and restoration on data of a terminal, an application normally operating in the terminal before the backup may not operate in the terminal after the restoration. For instance, despite the same terminal, an application may not operate normally if there is a version change of an operating system or a version change of the application. Moreover, if data of a specific terminal is attempted to be restored in a different terminal, the corresponding application may not operate normally. For detailed example, if an application is locked with application DRM (digital rights management), it may not operate in a different terminal.

Therefore, according to an example embodiment of the present invention, it may be able to manage an application, which may not operate in a specific terminal, using a blacklist. As mentioned in the foregoing description, the blacklist may mean a list of applications or data supposed not to be backed up to a specific terminal in the course of a backup restoration process. Hence, the backup restoration application does not regard applications corresponding to the blacklist as targets for backup or restoration.

Thus, a list of applications belonging to a blacklist may be backed up by a backup restoration application, whereas an application operating in a specific terminal only is managed via the blacklist. Therefore, according to an example embodiment of the present invention, an application may be directly received from an external server based on this list. In particular, when applications belonging to a blacklist are exactly restored in the terminal, they do not operate due to DRM and the like. Yet, application versions usable for the corresponding terminal may be received from an external server (e.g., market, etc.) based on a list of the applications belonging to the blacklist.

Figure 12:
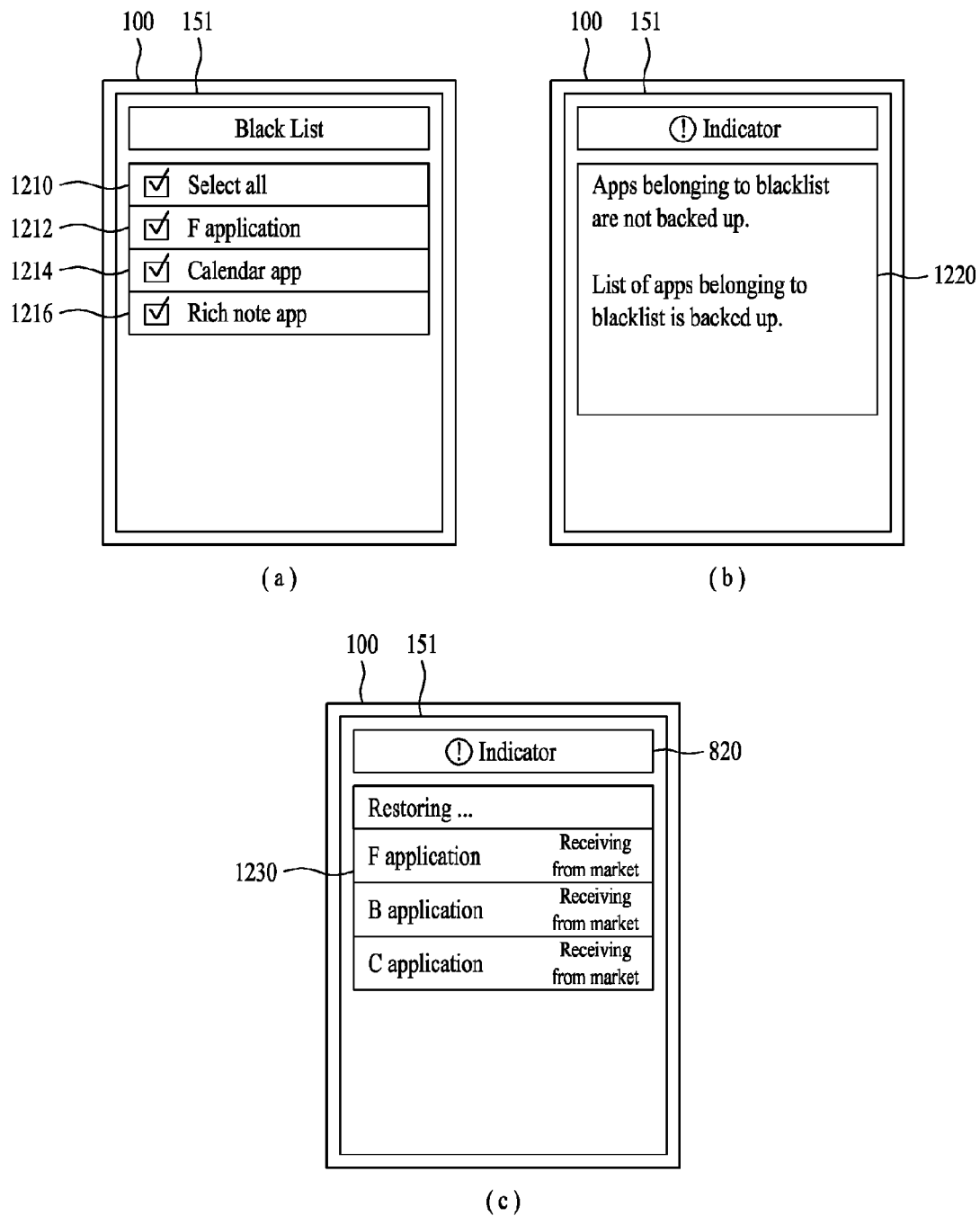
FIG. 12 is a diagram for a $4^{th}$ case of a restoration error occurrence according to an example embodiment of the present invention.

FIG. 12 is a diagram for a $4^{th}$ case of a restoration error occurrence according to an example embodiment of the present invention.

Referring to FIG. 12 (*a*), an F application 1212, a calendar app 1214 and a rich note app 1216 are displayed as applications managed via a blacklist by a backup restoration application.

Referring to FIG. 12 (*b*), a display window 1220 may be used to indicate that applications belonging to the blacklist are not backed up and that a summary list of the applications belonging to the blacklist is backed up.

Referring to FIG. 12 (*c*), it may be able to indicate that versions of the applications belonging to the blacklist, which are suitable for the corresponding terminal, are being received from an external server (e.g., market, etc.) based on the summary list.

Through this process, when an application is usable for a specific terminal only due to DRM and the like, if an application suitable for a restored terminal exist in an external server (e.g., market, etc.), restoration can be performed in a manner of receiving the corresponding application from the external server.

Meanwhile, the above-described methods can be implemented in a program recorded medium as processor-readable codes. Processor-readable media include ROM, RAM, CD-ROM, magnetic tapes, floppy discs, optical data storage devices, and the like for example and also include carrier-wave type implementations (e.g., transmission via Internet).

The aforementioned example embodiments of the mobile terminal are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, various example embodiments of the present invention described herein may enable an access to detailed information on an application previously inaccessible, thereby providing an optimal effect in backing up and restoring a terminal. Further, the present invention according to the above described example embodiments may solve a problem of restoration error due to an environment or configuration difference between a restoration target terminal and a backup target terminal.

It will be apparent to those skilled in the art that various modifications and variations can be made in the example embodiments of the present invention described herein and exemplified in the drawings without departing from the spirit or scope of the invention. Thus, it is intended that the present invention covers the modifications and variations of this invention provided they come within the scope of the appended claims and their equivalents.

What is claimed is:

1. A method of controlling a mobile terminal, the method comprising:
    backing up an application and detailed application information of the application stored in a backup target terminal;
    restoring the detailed application information other than the application to the restoration target terminal when a same version of the application is already installed on the restoration target terminal; and
    restoring the detailed application information other than the application to the restoration target terminal when the application is registered to a white list and when a higher version of the application is already installed on the restoration target terminal.

2. The method of claim 1, further comprising displaying an indicator window configured to indicate a process of a restoration operation.

3. The method of claim 1, wherein if the application is not installed on the restoration target terminal when the restoration target terminal is supposed to restore the detailed application information, the method further comprises:
    installing the application on the restoration target terminal by downloading the application from an external server, and then
    restoring the detailed application information of the application on the restoration target terminal.

4. The method of claim 1, wherein if the application is incompatible with the restoration target terminal, the method further comprises registering the application to a blacklist.

5. The method of claim 4, wherein when the application is registered to the blacklist, the method further comprises:
    backing up abstract information of the application is backed up, and
    downloading a compatible version of the application to the restoration target terminal from an external server using the abstract information of the application.

6. The method of claim 1, wherein the restoration target terminal is identical to the backup target terminal.

7. The method of claim 1, wherein the restoration target terminal is configured to operate by a same operating system of a version different from a version of the backup target terminal.

8. The method of claim 1, wherein the restoration target terminal is different from the backup target terminal.

9. A mobile terminal set as a restoration target, the mobile terminal comprising:
    a wireless communication unit configured to receive backup information of an application and detailed application information of the application; and
    a controller configured to:
        restore the detailed application information other than the application to the restoration target terminal when a same version of the application is already installed on the restoration target terminal; and
        restore the detailed application information other than the application to the restoration target terminal when the application is registered to a white list and when a higher version of the application is already installed on the restoration target terminal.

10. The mobile terminal of claim 9, further comprising a display, wherein the controller is further configured to cause the display to display an indicator window configured to indicate a process of a restoration operation.

11. The mobile terminal of claim 9, wherein if the application is not installed on the mobile terminal when the mobile terminal is supposed to restore the detailed application information, the controller is further configured to:
    install the application by downloading the application from an external server; and then
    restore the detailed application information of the application.

12. The mobile terminal of claim 9, wherein if the application is incompatible with the mobile terminal, the controller is further configured to:
    register the application to a blacklist; and
    install a compatible version of the application by downloading the application from an external server.

* * * * *